United States Patent
Sakazaki et al.

[15] 3,682,491
[45] Aug. 8, 1972

[54] POWER-OPERATED PRECISION CHUCK

[72] Inventors: Katsuhiko Sakazaki, Nagoya; Shigeru Saruhashi, Tsushima, both of Japan

[73] Assignee: Howa Kogyo Kabushiki Kaisha, Nagoya-shi, Japan

[22] Filed: Dec. 15, 1970

[21] Appl. No.: 98,376

[30] Foreign Application Priority Data

Oct. 29, 1970  Japan .......................45/96691
Nov. 2, 1970  Japan .......................45/94679

[52] U.S. Cl. .......................279/1, 279/110, 279/121
[51] Int. Cl. ..........................B23b 5/22, B23b 5/34
[58] Field of Search..........279/1, 121, 117, 118, 119, 279/120, 113, 110

[56] References Cited

UNITED STATES PATENTS

| | | |
|---|---|---|
| 1,367,014 | 2/1921 | Brooker.................279/110 X |
| 1,052,087 | 2/1913 | Niedhammer.............279/121 |
| 1,399,194 | 12/1921 | Cole.........................279/110 |
| 2,597,489 | 5/1952 | Huntting...................279/1 X |
| 3,085,813 | 4/1963 | Sampson....................279/1 X |

*Primary Examiner*—Harrison L. Hinson
*Attorney*—Holman & Stern

[57] ABSTRACT

A chuck comprises radially slidable work-gripping jaws with racks, radially movable sliders with racks engageable with the racks of the jaws, and an axially movable slider-actuating means for radially moving the sliders in unison. Spring means are provided which urge the racks of both the sliders and jaws out of engagement, and a locking or restraining device is provided to force the racks of the sliders and jaws into engagement against the force of the spring means to make the connection between the sliders and jaws. When the locking or restraining device is unlocked, the connection is broken to allow the jaws to be radially moved independently of the sliders for radial adjustment.

19 Claims, 18 Drawing Figures

PATENTED AUG 8 1972 3,682,491

POWER-OPERATED PRECISION CHUCK

BACKGROUND OF THE INVENTION

This invention relates to chucks and, more particularly, to a power-operated chuck adapted to be used with machine tools, for example.

Power-operated chucks are widely used, because they provide powerful gripping of works without causing looseness in cutting the works at high speed, afford fine gripping accuracy, and are particularly adapted to be used in mass production of few kinds of articles. However, the power-operated chucks of the conventional structure have short jaw stroke and, therefore, narrow range of gripping diameter. Therefore, the work-gripping jaws must be replaced or displaced every time the gripping diameter of the work is to be substantially changed.

However, required mounting accuracy has not been obtained from such replacement or displacement of the jaws made for the succeeding work. Therefore, in order to eliminate the inaccuracy in mounting the jaws, in the case of non-hardened jaws, correction has been made to the gripping parts of the jaws by cutting the parts on a machine tool on which the chuck is installed, and in the case of hardened jaws, special jaws have been prepared for respective kinds of works, mating marks being applied on both the jaws and sliders carrying the jaws, these marks then being alined so as to obtain the required mounting accuracy.

On the other hand, it has been customary for the jaws to be manually handled or adjusted one by one in accomplishing the above-mentioned procedure, which necessitates much time and labor.

It will be apparent that the above-stated replacement and adjustment must be frequently repeated in small scale production of many kinds of articles, which naturally reduces the working efficiency of the machine tool. Accordingly, it may be said that the conventional chucks are disadvantageous in that the merits of the power-operated chucks cannot be fully utilized, and undesirable extra expenses for preparing special jaws and extra labor for additionally adjusting the jaws are incurred.

SUMMARY OF THE INVENTION

A principal object of the invention is to provide a power-operated chuck which overcomes the above-stated difficulties.

Another object of the invention is to provide a new and improved chuck wherein the work-gripping jaws can be replaced or adjusted easily and quickly without causing inaccuracy in mounting the jaws.

Still another object of the invention is to provide a new and improved chuck wherein means are provided to hold the jaws so as to prevent unintended movement thereof when the jaws are disconnected from sliders which carry the jaws.

A further object of the invention is to provide a new and improved chuck including means for ascertaining complete engagement of racks of the jaws and sliders.

A further object of the invention is to provide a new and improved chuck which is reliable in operation.

In accordance with the invention, briefly stated, the chuck comprises a body, radially arranged work-gripping jaws each mounted in said body for radial sliding movement, each of said jaws having a rack, radially arranged sliders mounted in said body for radial sliding movement and having racks engageable with said respective racks of the jaws, a slider-actuating means axially slidable within said body to radially move said sliders in unison, means for axially driving said slider-actuating means, means for resiliently urging the racks of said sliders out of engagement with the racks of said jaws, and locking means capable of being locked to force the racks of said sliders into engagement with the racks of said jaws against the resilient action of said resilient urging means to couple the jaws to said sliders, and capable of being unlocked to yield to the resilient action of said resilient urging means to cause the racks of said sliders to be disengaged from the racks of said jaws so as to allow displacement or replacement of the jaws independently of the sliders.

The nature, principle and utility of the invention will be more readily apparent from the following detailed description with respect to preferred embodiments thereof when read in conjunction with the accompanying drawings.

DETAILED DESCRIPTION

FIGS. 1 through 6, inclusive, show a first embodiment of the invention.

Figure 1:
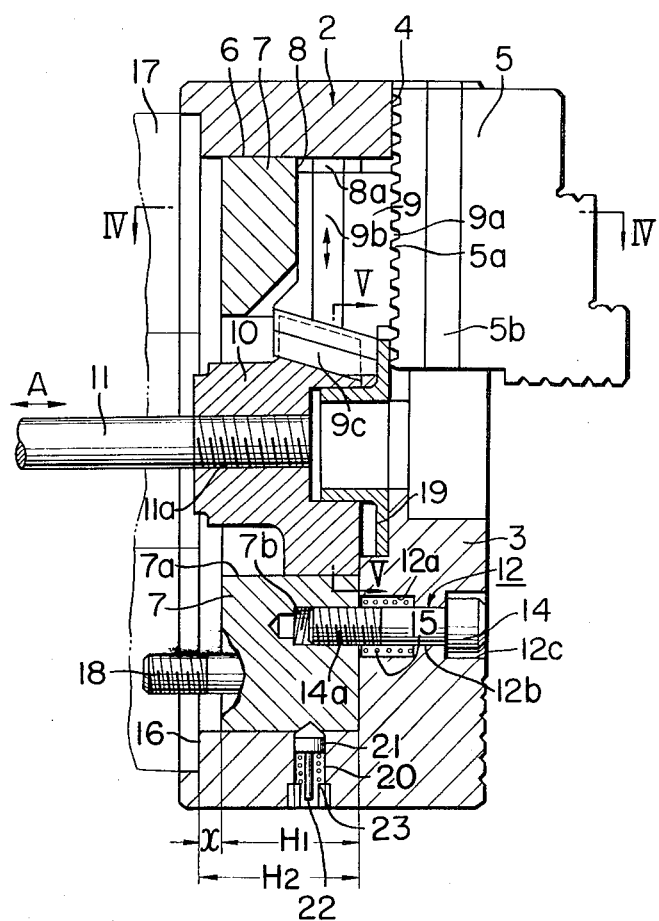
FIG. 1 is a longitudinal section of a chuck embodying this invention, with only one jaw being shown.
Figure 4:
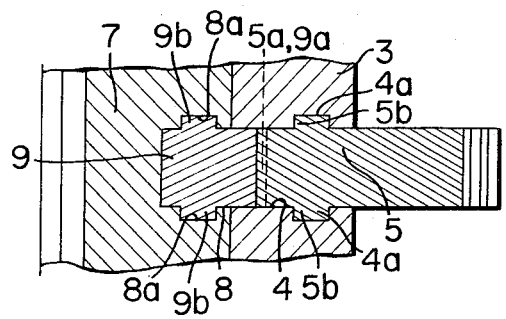
FIG. 4 is a section taken along the line IV—IV of FIG. 1.

In FIG. 1, reference numeral 2 generally designates a chuck body having a front part 3. The front part 3 is provided with radial slots 4 (three radial slots in the example shown) which are arranged at an equal angular distance therebetween. In the opposite side walls of each slot, guide grooves 4a and 4a are formed as shown in FIG. 4.

A work-gripping jaw 5 provided with a precise rack 5a on the rear surface thereof is slidable in a radial direction within each slot 4. Protruding parts 56 radially formed on both sides of the jaw 5 are fitted in the guide grooves 4a, respectively, and guided thereby in a radial direction.

As shown in FIG. 1, an annular guide block 7 is fitted in a bore 6 formed in the chuck body 2 and is axially movable therealong. Slots 8 are formed in the front surface of the guide block 7. The number of the slots 8 is same as that of the slots 4, and the slots 8 are arranged in axially registered relationship to the respective slots 4. Guide grooves 8a are formed in the opposite side walls of each slot 8.

Figure 5:
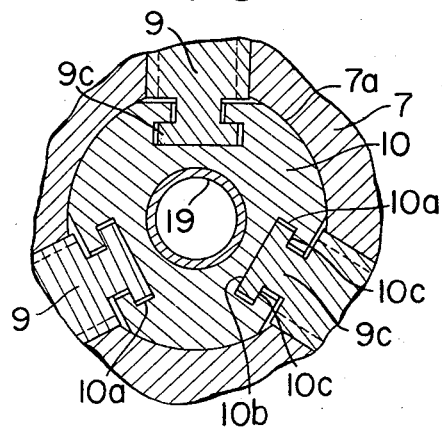
FIG. 5 is a fragmentary section taken along the line V—V of FIG. 1.

A slider 9 is inserted in each slot 8 and is slidable in a radial direction. The slider 9 is provided with radially extending protruding parts 9b which are guided in the grooves 8a. A precision rack 9a is formed on the front surface of the slider 9. The rack 9a has the same pitch as the rack 5a of the work-gripping jaw 5 and is engaged with the rack 5a. Further, at the radially inner end portion of the slider 9, a tapered part 9c of T-shaped cross section is provided as shown in FIG. 5.

A slider actuating member 10 is axially slidably fitted in the bore 7a of the guide block 7. Tapered grooves 10a of a T-shaped cross section are formed in the peripheral portion of the member 10, and slidably receive therein the respective T-shaped tapered parts 9c.

A pulling rod 11 is screwed by its threaded portion 11a into the central portion of the slider-actuating member 10. The rod 11 is adapted to be driven in an axial direction as shown by arrow A in FIG. 1 by means of a pneumatic cylinder, a hydraulic cylinder, or any other suitable driving means (which are not shown).

Through-hole 12 are formed in an axial direction in the front part 3 of the chuck body 2, as shown in FIG. 1. In the embodiment shown, three through-holes 12 are provided. Each of the through-holes consists of two larger diameter portions 12a and 12c located at both ends of the hole and one smaller diameter portion 12b. A bolt 14 is inserted through the larger and smaller diameter portions, and is screwed into the female-threaded hole 7b in the guide block 7 by the threaded portion 14a cut on the end of the bolt 14. Further, a compression spring 15 is disposed in the larger diameter portion 12a of the through-hole 12.

Figure 3:
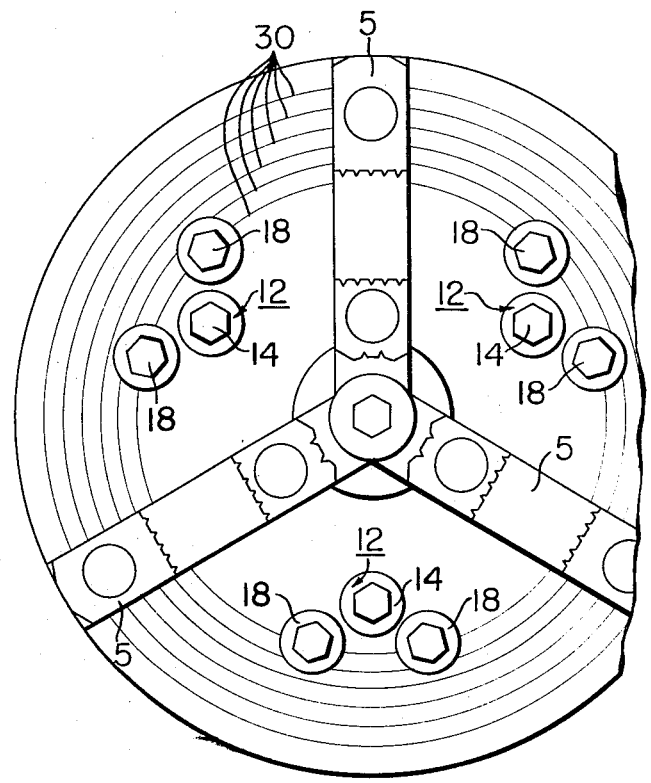
FIG. 3 is an end view as seen from the right-hand side of FIG. 1.

The axial length $H_1$ of the guide block 7 is smaller than that $H_2$ of the bore 6 in the chuck body 2. Consequently, in the condition shown in FIG. 1 in which the guide block 7 is brought in contact with the inside surface of the front parts against the force of the compression spring 15 by tightening the bolt 14, there is a space $x$ produced between the rear end surface of the guide block 7 and the rear end edge of the bore 6. The width $x$ of the space is made slightly larger than the depth of mutual engagement between the rack 5a of the gripping jaws and the rack 9a of the slider 9. A flange 17 of a machine tool shown by a dot-and-dash line in FIG. 1 is inserted in a stepped part 16 formed in the rear end of the chuck body. The chuck body 2 is fixed onto the flange 17 by screwing the threaded portions of fixing bolts 18 through the body 2 into the flange 17 in an axial direction. As shown in FIG. 3, two fixing bolts 18 may be provided adjacent to every bolt 14 mentioned above.

An annular dust-preventive member 19 is inserted between the front part 3 of the chuck body and the slider-actuating member 10. The member 19 is secured on the chuck body and serves to prevent dust from entering the chuck through the center hole of the front part 3.

A hole 20 is cut through the cylindrical part of the chuck body 2 in a radial direction, and an indication pin 22 is inserted in the hole 20. The pin 22 is resiliently urged radially inwardly by a spring 23 disposed between a head 21 of the pin and a nut 24 threaded into the hole 20. In the condition shown in FIG. 1, the head 21 of the pin 22 is engaged with a recess 25 formed in the peripheral surface of the guide block 7, and the tail end portion of the pin 22 is positioned in the chuck. However, in the condition wherein the guide block 7 is moved rearwardly as shown in FIG. 2, the head 21 of the pin 22 is moved radially outwardly, being removed from the recess 25, and therefore the tail end portion of the pin 22 is exposed outside the chuck.

Figure 2:
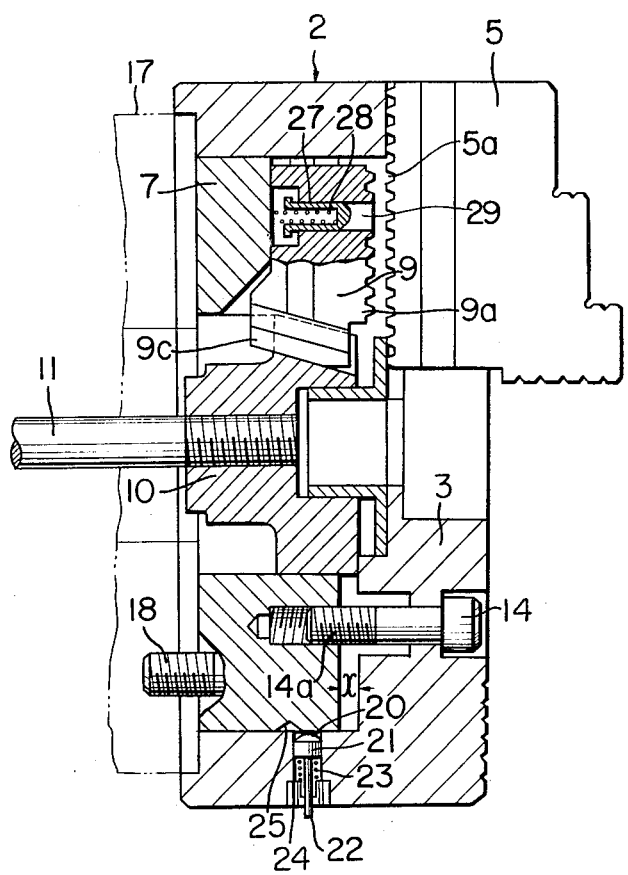
FIG. 2 is a view similar to FIG. 1, but showing a different state allowing displacement or replacement of jaws.

As shown in FIG. 2, the slider 9 is provided with an axial hole 27. A stopping pin 29 is inserted in the hole 27, and the pin 29 is resiliently urged toward the gripping jaw 5 by a spring 28. The tip end of the pin 29 is adapted to engage the rack 5a so that the jaw 5 is not dropped off when the rack 5a of the jaw 5 is disengaged from the rack 9a of the slider 9.

In FIG. 3, reference numeral 30 indicates concentric grooves which serve as reference lines in positioning the jaws when the mounting position of the jaws 5 is to be changed.

The operation of the chuck of the above described organization is as follows:

As shown in FIG. 1, the chuck is used under the condition wherein the bolt 14 is tightened. Under this condition, when the pulling rod 11 is moved forwardly or rearwardly in the axial direction "A" by the driving means (not shown), the sliders 9 are moved outwardly or inwardly in the radial directions by the wedging action produced by the relative sliding movement between the T-shaped tapered grooves 10a of the slider-actuating member 10 and the T-shaped tapered parts 9a of the slider 9 which are mutually engaged with each other.

Now, when the member 10 is moved forwardly, the groove bottoms 10b of the tapered grooves 10a push up the sliders 9, while the member 10 is moved rearwardly, the jaw portions 10c of the tapered grooves 10a pull down the sliders 9. However, the smaller the inclination of the T-shaped engagement portions 9c and 10a of the slider 9 and the member 10 is, the greater is the transmitted power and the narrower the operating range of the slider 9. As mentioned above, when the slider 9 is moved inwardly or outwardly, the work-gripping jaws 5 connected to the slider 9 through the racks 5a and 9a are also moved inwardly or outwardly, thereby to grip or to release the work.

Figure 6:
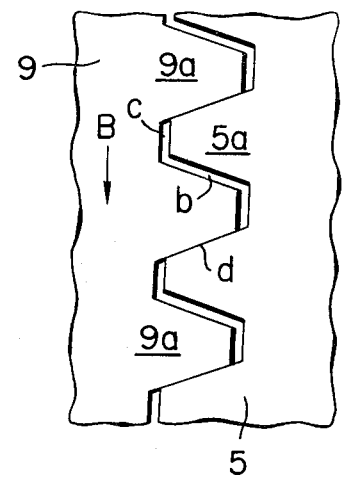
FIG. 6 is an enlarged fragmentary view showing racks of a slider and a jaw in mutual engagement.

In addition, under the condition illustrated in FIG. 1, the pitch lines of the rack 5a of the jaw 5 and of the rack 9a of the slider 9 are alined with each other, as shown in FIG. 6, thereby to make a regular clearance "C" therebetween. When the rack 9a is moved in the direction of arrow "B," a backlash "b" is formed, and a great power is transmitted from the rack 9a through the surfaces "d" only, to the teeth of the rack 5a. Accordingly, the gripping portions of the jaws 5 can be accurately moved toward the work.

When it is required to adjust the moving range of the gripping jaws 5 in order to work on a new work piece which is out of the moving range of the jaws after a work having been completed by a machine tool, the bolt 14 is loosened by an operator. In other words, the bolt 14 is unscrewed in the guide block 7. In this condition, the head of the bolt 14 is not displaced axially outwardly because the force of the spring 15 acts on the surface of the guide block 7 at all times, and only the guide block 7 is moved rearwardly in the axial direction, leaving the front part 3. Consequently, the sliders 9 engaged with the guide block 7 are moved rearwardly together with the guide block 7, sliding along the bottom portions 10b of the T-shaped tapered grooves 10a to also move radially outwardly. The work-gripping jaws 5 are also moved slightly outwardly together with the sliders 9 in the radial direction until the racks 9a of the sliders 9 are disengaged from the racks 5a of the jaws 5, and after the racks 5a and 9a are disengaged, the condition shown in FIG. 2 is obtained. Under this condition, there exists a space x between the front part 3 of the chuck body and the guide block 7, and the end portion of the indication pin 22 is protruded outside the chuck body 20. This protrusion of the pin 22 indicates that the work-gripping jaws 5 are disengaged from the sliders. At this time, the weight of the jaws 5 is supported both by the engagement, made by the force of the spring 28, between the jaws 5 and the stopping pins 29 and by the frictional force between the sliding members. Therefore, the operator can easily slide the jaws in the radial directions by applying external force to the jaws.

When the work-gripping jaws 5 are moved to positions which are the most suitable for gripping the next work of different dimension, by referring to the scale 30, the tip end of the stopping pin 29 is locked in the bottom of the rack 5a. On the other hand, if the next work has such a shape or dimension that requires another work-gripping jaws, the present jaws should be replaced with the other jaws suitable for the work and then the thus replaced jaws should be held at the most suitable position thereof in the same way as above.

Next, by tightening the bolts 14, the guide block 7 is moved forwardly against the force of the spring 15. At the same time, the sliders 9 are moved forwardly; the stopping pin 29 is hidden inside the rack 9a, while holding the rack 5a; the racks 5a and 9a are completely engaged with each other when the guide block 7 is tightened completely into contact with the front part 3; and thus the condition shown in FIG. 1 is obtained. It is to be noted, however, that in this case, the engagement position of the rack 5a with respect to the rack 9a is different from that of the first case. Now, the operator confirms the complete engagement of the racks by observing that the indication pin 21 is sunk under the surface of the chuck body, and completes the adjustment of the work-gripping jaws. At this time, the further adjustment of the work-gripping jaws 5 is not necessary because of the precision engagement of the racks 5a and 9a.

Figure 7:
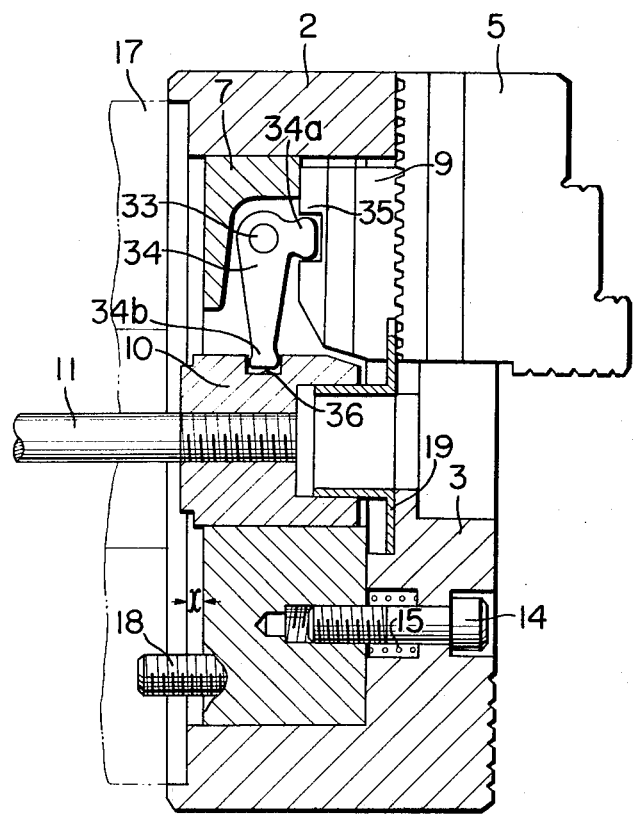
FIG. 7 is a view similar to FIG. 1, but showing a modified form of the chuck shown in FIG. 1.

A modification of the chuck shown in FIG. 1 is illustrated in FIG. 7. The difference of the modification from the chuck of FIG. 1 resides in that the sliders 9 and the slider-actuating member 10 are not engaged through the T-shaped tapered portions and tapered grooves found in the embodiment of FIG. 1, but are connected through a bellcrank 34 which is pivotally supported at its center portion by a stationary pin 33 secured on the guide block 7. One end 34a of the bellcrank 34 engages a recess 35 formed in the rear surface of the slider 9, while the other end 34b engages a recess 36 formed in the peripheral surface of the member 10. Therefore, when the member 10 is moved in the axial direction, the bellcrank 34 is turned about the pin 33, thereby displacing the sliders 9 radially outwardly or inwardly.

Figure 8:
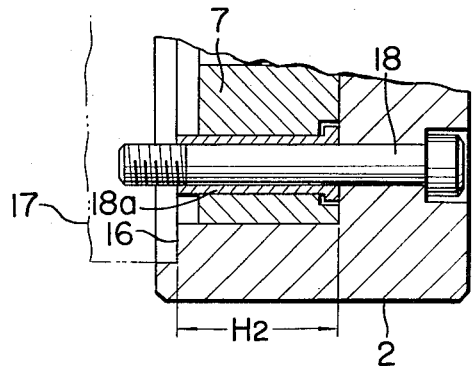
FIG. 8 is a fragmentary sectional view showing another modification of the chuck shown in FIG. 1.

FIG. 8 shows a partial improvement of the chuck shown in FIG. 1. In this improved example, the fixing bolts 18 for fixing the chuck body 2 onto the flange 17 are each provided with a spacer sleeve 18a surrounding the bolt 18. The axial length of the spacer sleeve 18a is equal to or slightly larger than the axial length $H_2$. Therefore, in the fixed condition of the chuck, the sleeve 18a abuts against the inner wall of the chuck body 2 at one end thereof, and against the front surface of the flange 17 at the other end thereof, thereby functioning as a spacer means which prevents axial deformation of the chuck body 2 against the tightening force of the fixing bolt 18.

FIGS. 9 through 17, inclusive, show a further modification of the chuck.

Figure 9:
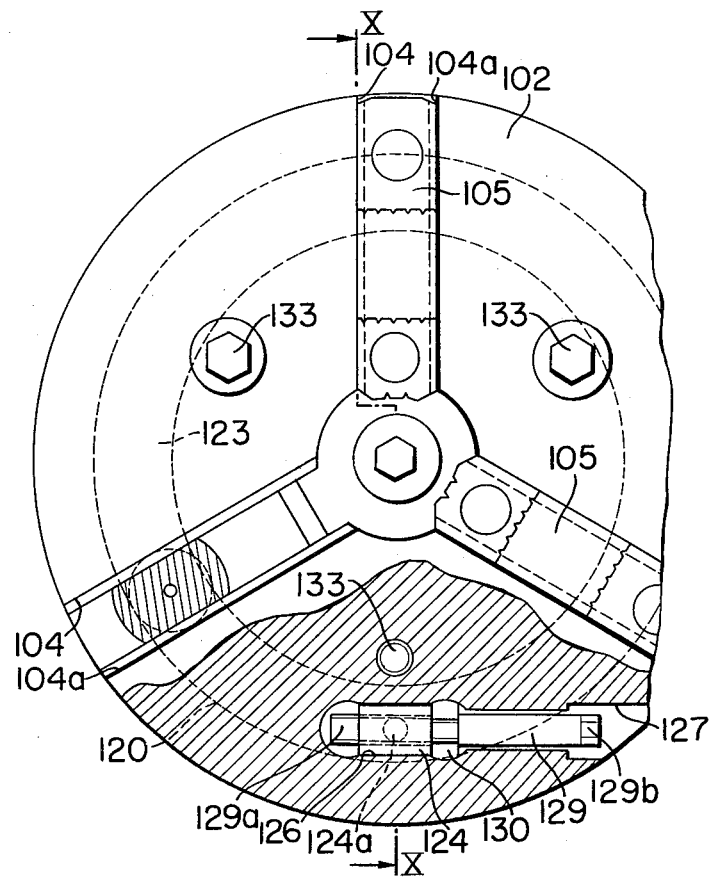
FIG. 9 is an end view of a further modified form of the chuck according to this invention.
Figure 10:
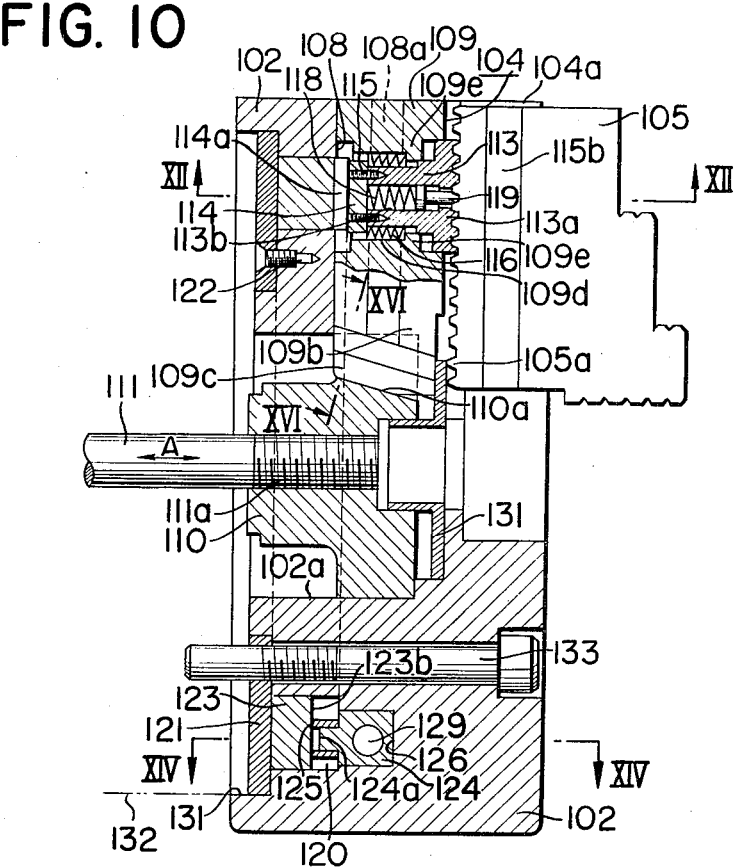
FIG. 10 is a longitudinal section taken along the line X—X of FIG. 9.
Figure 11:
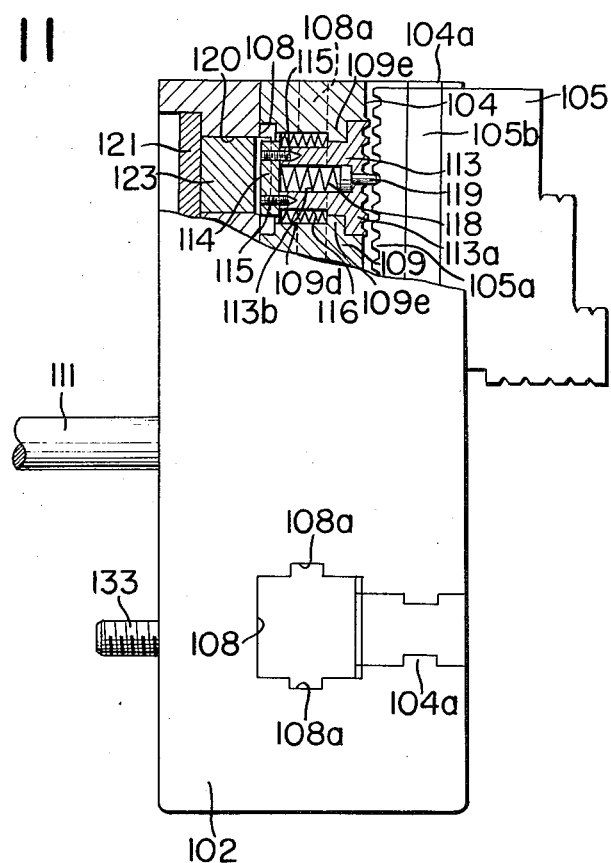
FIG. 11 is a view, partly in section, similar to FIG. 10, but showing a different state allowing displacement or replacement of the jaws.

In FIGS. 9, 10, and 11, reference numeral 102 generally indicates a cylindrically shaped chuck body. Radial slots 104 are formed at an equal angular distance in the front side of the chuck body. Radial protrusions 104a are formed on the opposite side walls of each slot 104, as shown in FIGS. 12 and 13.

A work-gripping jaw 105 provided with a precision rack 105a on the rear side thereof is slidably inserted in each of said slots 104. Grooves 105b radially formed in both sides of the jaw 105 receive respective protrusions 104a.

Figure 12:
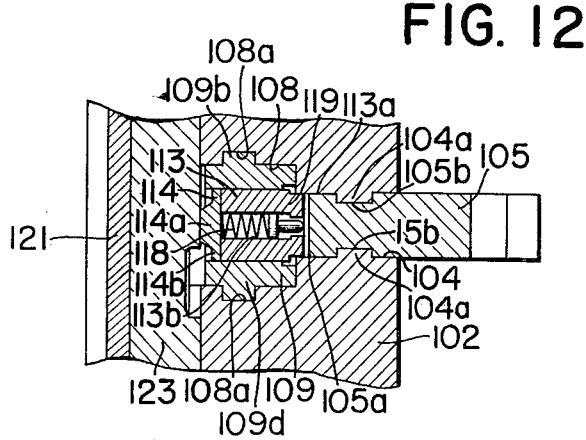
FIG. 12 is a section taken along the line XII—XII of FIG. 10.
Figure 13:
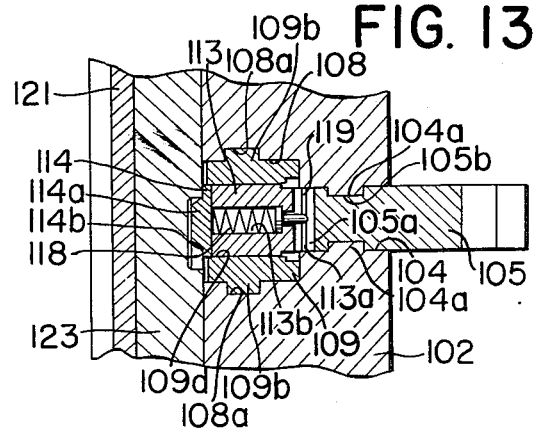
FIG. 13 is a view similar to FIG. 12, but showing a state corresponding to that shown in FIG. 11.
Figure 16:
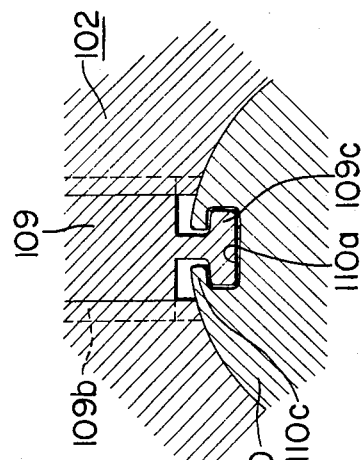
FIG. 16 is an enlarged fragmentary section taken along the line XVI—XVI of FIG. 10.
Figure 15:
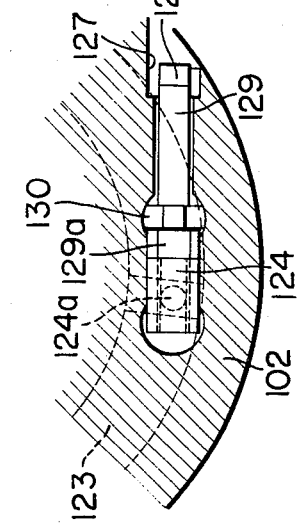
FIG. 15 is a fragmentary view similar to FIG. 9, but showing a state different from that of FIG. 9.

As shown in FIGS. 10 and 12, slots 108 are formed in the chuck body 102. The slots 108 are in axially registered relationship to the slots 104, and further the number of the slots 108 is same as that of the slots 104. Each slot 108 is communicated with the respective slot 104 and extends in a radial direction. Guide grooves 108a are formed in the opposite side walls of each slot 108. A slider 109 is slidably inserted in a radial direction in each slot 108. Radially extending protrusions 109b are provided on the slider 109, and guided in the opposite grooves 108a. At the radially internal end portion of each of the sliders 109, a tapered portion 109c of a T-shaped cross section is formed, as clearly shown in FIG. 16. A slider-actuating member 110 (FIGS. 9 and 16) is axially slidably fitted in a bore 102a formed in the chuck body 102. Tapered grooves 110a of a T-shaped cross section are formed in the peripheral portion of the member 110, and slidably receive therein the respective T-shaped tapered portions 109c. A pulling rod 111 is screwed into the central portion of the member 110 at 111a. The rod 111 is adapted to be driven by a pneumatic cylinder, a hydraulic cylinder, or any other suitable driving means (all not shown) in an axial direction as shown by arrow A in FIG. 10.

As is apparent from FIGS. 10 and 12, each slider 109 is provided with a through hole 109d formed in an axial direction. An engagement piece 113 is slidably inserted in the through-hole 109d. A rack 113a is cut on the front end portion of the engagement piece 113, and the rack 113a is engaged with the rack 105a of the jaw 105. A cover plate 114 is fixed by a mounting screw 115 onto the rear end portion of the piece 113, as shown in FIGS. 10 and 11. The cover plate 114 has a protruded portion 114a on its surface, and lower portions 114b are formed on both sides of the protruded portion 114a as shown in FIGS. 12 and 13.

As indicated in FIG. 10, step portions 109e formed in the through-hole 109d guiding the engagement piece 113. A compression spring 116 is disposed between the step portions 109e and the cover plate 114, and serves to urge the engagement piece 113 in such a direction that the piece 113 is held away from the work-gripping jaw 5. Accordingly, the rack 113a of the engagement piece 113 tends to become free from the engagement with the rack 105a of the jaw 105.

An hole 113b is provided in an axial direction inside the engagement piece 113. A stopping pin 119 is slidably inserted in the hole 113b and the pin 119 is resiliently urged toward the work-gripping jaw 105 by a compression spring 118.

The tip end portion of the stopping pin 119 is retracted from the tooth-surface of the rack 113a as shown in FIG. 10 when the racks 105a and 113a are engaged with each other, and the tip end portion of the pin 119 engages the teeth of the rack 105a when the racks 105a and 113a are disengaged.

Further, an annular space 120 concentric to the pulling rod 111 is provided in the chuck body at the rear of the slide-guiding slots 108. One side of the annular space 120 is communicated with the slots 108, and the other side is closed by an annular closing plate 121. The closing plate 121 is fixed to the chuck body 102 by a retaining screw 122 (FIG. 10).

Figure 17:
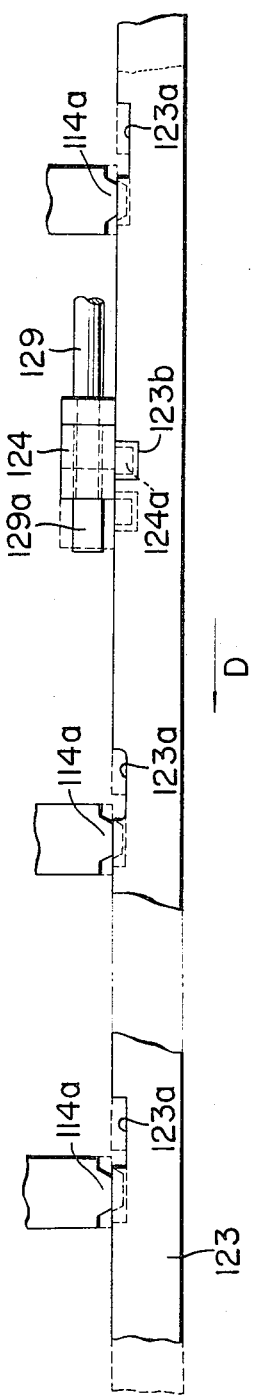
FIG. 17 is a developed view showing an operating ring and its cooperating members.

An operating ring 123 is inserted in the annular space 120, and is rotatable about the rod 111. As shown in FIG. 17 showing a developed view, the operating ring 123 has recesses 123a at predetermined intervals in the side facing the engagement piece 113. These recesses 123a are positioned approximately oppositely to the respective engagement pieces 113, and normally the protruded portions 114a provided on the surface of the cover plate 114 are elastically abutted by the action of the springs 116 against the surface of the operating ring 123, namely, against the higher portions located beside the recesses 123a.

Figure 14:
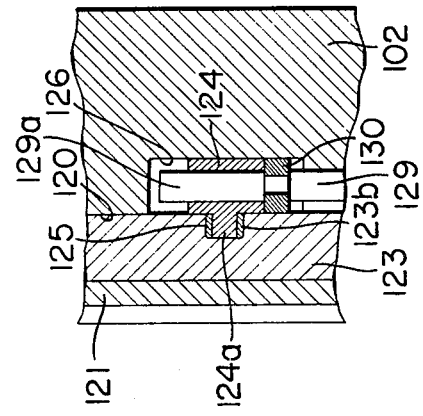
FIG. 14 is a fragmentary section taken along the line XIV—XIV of FIG. 10.

An operating groove 123b is formed in the surface of the operating ring 123. As shown in FIGS. 10, 14, and 17, a protruded portion 124a formed on an operating nut 124 is fitted in the operating groove 123b. A bushing 125 as shown is preferably put on the protruded portion 124a. The operating nut 124 is of a square cross section as shown in FIG. 10, and is supported slidably but not rotatably in a guide way 126 which is communicated with the annular space 120. As shown in FIG. 9, the guide way 126 extends in an tangential direction with respect to the annular space 120 and is communicated with the external space of the chuck through a recess 127 for inserting a rotating tool.

The threaded portion 129a of an operating screw 129 is screwed into the operating nut 124. A square head 129b of the screw 129 is placed in the recess 127 for being engaged by the rotating tool. In order to prevent the longitudinal movement of the screw 129, a stopper 130 is fixed in the guide way 126 and the stopper 130 serves to rotatably hold the small diameter portion of the screw 129.

A ring-shaped dust-preventive member 131 (FIG. 10) is inserted between the chuck body 102 and the slide-actuating member 110. The member 131 is secured on the chuck body 102 and prevents dust from entering the chuck body through the center hole on the front surface of the chuck body.

A flange 132 of a machine tool shown by a dot-and-dash line is fitted into a stepped portion 131 (FIG. 10) formed on the rear portion of the chuck body 102. The chuck body 102 is fixed to the flange 132 by screwing the threaded portions of retaining bolts 133, which pass through the chuck body in an axial direction, into the flange 132.

The operation of the above-mentioned modified chuck is as follows:

The chuck is used under the condition wherein the racks 105a of the work-gripping jaws 105 all engaged with the racks 113a of the engagement pieces 13, as shown in FIG. 10. Under this condition, the protruded portions 114a for the engagement pieces 113 are resiliently urged onto the surface of the operating ring 123 as shown in FIG. 17. When the pulling rod 111 is moved forwardly or rearwardly in the axial direction by the driving means (not shown), the sliders 109 are radially outwardly or inwardly moved by the wedging action produced by the relative sliding movement of the T-shaped tapered portions 110a and 109c. When the sliders 109 are moved inwardly or outwardly, the work-gripping jaws 5 are also moved inwardly or outwardly, thereby to grip or to release the work, respectively.

When it is required to adjust the moving range of the work-gripping jaws 105 in order to work on a new work piece which is out of the moving range of the jaws after a work having been completed by a machine tool, the operating screw 129 is turned by an operator with the rotating tool, such as a spanner, put on the head 129b. When the operating screw 129 is thus turned in a forward direction, the operating nut 124 is displaced leftwardly from the position of FIG. 9 to the position of FIG. 15, whereby the operating ring 123 in which the protruded portion 124a of the operating ring 124 is fitted is turned clockwise as viewed in FIG. 9 and in the direction of arrow "D" (FIG. 17). Then, the protruded portions 114a which is abutted against the surface of the operating ring 123, are dropped into the recesses 123a in the operating ring 123, the engagement pieces 113 are positioned as shown in FIG. 11 and further the racks 113a are disengaged from the racks 105a of the work-gripping jaws 5. At the same time, the tip end of the stopping pin 119 is engaged between the teeth of the rack 105a thereby to prevent the work-gripping jaw from moving without control. However, the tip end of the stopping pin 119 is shaped round, and therefore the jaws 105 can be easily slid by the operator in radial directions.

Now, when the work-gripping jaws 5 are moved to positions which are the most suitable for gripping the next work of different dimension, the tip end of the stopping pin 119 is locked in the bottom of the rack 105a thereby to stop the movement of the jaw 5. Like the embodiment of FIG. 1, if the work has such a shape and dimensions that require other jaws, the present jaws should be replaced with the other jaws suitable for the work and then the thus replaced jaws should be held at the most suitable position thereof.

Next, when the operating screw 129 is turned in the direction opposite to the former direction by using the rotating tool, the operating ring 123 is moved back to the right in FIG. 17, and the protruded portions 114a are removed up from the recesses 123a against the force of the springs 116 and are abutted against the surface of the operating ring 123. Therefore, the engagement piece 113 are moved back from the position shown in FIG. 11 to that shown in FIG. 10 and the rack 113a of the engagement piece 113 is brought into engagement with the rack 105a of the jaw 105.

Figure 18:
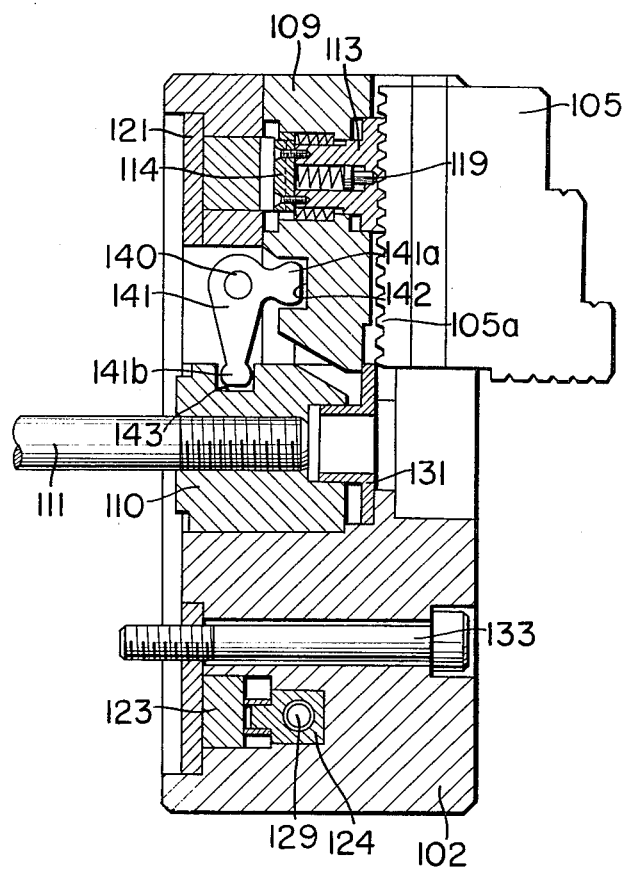
FIG. 18 is a view similar to FIG. 10, but showing a modification of the chuck shown in FIG. 10.

A modified form of the chuck shown in FIG. 10 is illustrated in FIG. 18. The difference of this modification from the chuck of FIG. 10 resides in that the slider 109 and the slider-actuating member 110 are not engaged by the tapered groove and the tapered portion having the T-shaped cross section, but are connected through a bellcrank 141 which is pivotally supported at its center portion by a stationary pin 120 secured on the chuck body 2. One end 141a of the bellcrank 141 is engaged with a recess 142 formed in the rear surface of the slider 109, while the other end 141b is engaged either a recess 143 formed in the peripheral surface of the member 110. Therefore, when the member 110 is moved in the axial direction, the bellcrank 141 is turned in higher of the directions, thereby displacing the sliders 109 in radial directions, inwardly or outwardly.

Although preferred embodiments of the invention have been shown and described, it is apparent that the invention may be embodied in other forms without departing from the spirit and scope of the invention. For example, the racks may be helical racks.

We claim:

1. A chuck comprising a body, radially arranged work-gripping jaws each mounted in said body for radial sliding movement, each of said jaws having a rack, radially arranged sliders mounted in said body for radial sliding movement and having racks engageable with said respective racks of the jaws, a slider-actuating means slidable axially within said body to radially move said sliders in unison, means for axially driving said slider-actuating means, means for resiliently urging the racks of said sliders out of engagement with the racks of said jaws, and locking means capable of being locked to force the racks of said sliders into engagement with the racks of said jaws against the resilient action of said resilient urging means to couple the jaws to said sliders, and capable of being unlocked to yield to the resilient action of said resilient urging means to cause the racks of said sliders to be disengaged from the racks of said jaws so as to allow displacement or replacement of the jaws independently of the sliders.

2. The chuck according to claim 1, wherein the rack of said jaws are provided on one axial end surfaces thereof and the racks of said sliders are provided on adjacent axial end surfaces of the sliders, and wherein said means for resiliently urging the racks include at least one axially extending compression spring.

3. A chuck comprising a body, radially arranged work-gripping jaws each mounted in said body for radial sliding movement, each of said jaws having a rack, a guide block axially slidable in said body, radially arranged sliders mounted in said guide block for radial sliding movement and having racks respectively engageable with said racks of said jaws, a slider-actuating means slidable axially within said body, movement transmitting means connecting said slider-actuating means to said sliders to transform the axial movement of the slider-actuating means into radial movement of the sliders, means for axially driving said slider-actuating means, means for resiliently urging said guide block away from said jaws to cause the racks of said sliders out of engagement with the racks of said jaws, and locking means capable of being locked to force said guide block toward said jaws against the resilient action of said resilient urging means to cause the racks of said sliders to be brought into engagement with the racks of said jaws, and capable of being unlocked to cause said guide block to yield to the resilient action of said resilient urging means thereby to cause the racks of said sliders to be disengaged from the racks of said jaws so as to allow displacement or replacement of the jaws independently of the sliders.

4. The chuck according to claim 3, wherein said guide block is an annular ring having an axial bore and said slider-actuating means is slidable in said bore.

5. The chuck according to claim 3, wherein said movement transmitting means are wedging connections between said slider-actuating means and said sliders.

6. The chuck according to claim 3, wherein said movement transmitting means are bellcrank lever connections between said slider-actuating means and said sliders.

7. The chuck according to claim 3, wherein said means for resiliently urging the guide block is a compression spring interposed between the chuck body and the guide block.

8. The chuck according to claim 3, wherein said locking means is a screw passing through the chuck body and threaded into said guide block.

9. The chuck according to claim 3, further including indication means comprising a pin passing radially through said chuck body to engage the peripheral surface of said guide block and resiliently urged radially inwardly, and a recess in said peripheral surface which receives the inner end of said pin to retract the same into the chuck body when the racks of said sliders have been completely engaged with that of the maws.

10. The chuck according to claim 3, further including fixing bolts passing through the chuck body and the guide block to fix the chuck on an object, and a spacer sleeve passing through said guide block and disposed around each fixing bolts.

11. The chuck according to claim 3, further including a stopping pin slidable in each of said sliders and resiliently urged toward the rack of the jaw to engage and hold the same when the racks of the slider and jaw are out of engagement.

12. A chuck comprising a body, radially arranged work-gripping jaws each mounted in said body for radial sliding movement, each of said jaws having a rack, radially arranged sliders mounted in said body for radial sliding movement, a slider-actuating means slidable axially within said body, movement transmitting means connecting said slider-actuating means to said sliders to transform the axial movement of the slider-actuating means into radial movement of the sliders, means for axially driving said slider-actuating means, an engagement piece passing through each of the sliders for sliding movement and having on one end thereof a rack engageable with the rack of the jaw, means for resiliently urging said engagement piece so as to cause the rack thereof to move out of engagement with the rack of said jaw, and locking means capable of being locked to force said engagement pieces toward the jaws against the resilient action of said resilient urging means to cause the racks of said engagement pieces to be brought into engagement with the racks of said jaws, and capable of being unlocked to cause said engagement pieces to yield to the resilient action of said resilient urging means thereby to cause the racks of said engagement pieces to be disengaged from the racks of said jaw so as to allow displacement or replacement of the jaws independently of the sliders.

13. The chuck according to claim 12, wherein said movement transmitting means are wedging connections between said slider-actuating means and said sliders.

14. The chuck according to claim 12, wherein said movement transmitting means are bellcrank lever connections between said slider-actuating means and said sliders.

15. The chuck according to claim 12, wherein said means for resiliently urging the engagement piece is a compression spring interposed between the slider and the engagement piece.

16. The chuck according to claim 12, wherein said locking means comprises an operating ring reciprocably rotatable in the chuck body and having a series of recesses distributed in the surface thereof, and means for rotating said operating ring, said operating ring, when the latter is in the unlocked position, receiving into its recesses the other ends of said engagement pieces to allow the latter to yield to the resilient action of the resilient means, and, when the operating ring is in the locked position, expelling from its recesses the other end of said engagement pieces to cause the latter to move onto the jaws against the resilient action of the resilient means.

17. The chuck according to claim 16, wherein said engagement pieces have on the other ends thereof protrusions, respectively, which are adapted to enter said recesses.

18. The chuck according to claim 16, wherein said means for rotating the operating ring comprises a nut having a protruding part engaging the operating ring, and rotatably mounted in the chuck body, and a threaded rod screwed in said nut to turn the same.

19. The chuck according to claim 12, further including a stopping pin slidable in each of said engagement pieces and resiliently urged toward the rack of the jaw to engage and hold the same when the racks of the slider and jaw are out of engagement.

* * * * *